May 5, 1964 W. A. O'BRYANT 3,132,015
FILTER ASSEMBLY
Filed July 12, 1961

INVENTOR.
Waitus A. O'Bryant
BY
ATTORNEY.

United States Patent Office 3,132,015
Patented May 5, 1964

3,132,015
FILTER ASSEMBLY
Waitus A. O'Bryant, 8745 Mission Road, Leawood, Kans.
Filed July 12, 1961, Ser. No. 123,526
1 Claim. (Cl. 55—491)

This invention relates to dirt and dust filters for heating and air conditioning equipment ducts and refers more particularly to an improved filter construction which is adapted to provide a complete circumferential seal in fluid flow ducts of all types and forms, including any gas flow ducts in which filters are employed to block passage of undesirable particles and substances.

This application is a continuation-in-part of my application Serial No. 845,994, filed October 12, 1959, entitled "Filter for Heating and Air Conditioning Ducts," now U.S. Patent 3,019,854.

Most filters conventionally employed to remove dust and dirt from air passing through heating, ventilating and air conditioning ducts ordinarily lose a great deal of their effectiveness by reason of the fact that the filter media (glass fibers, synthetic fibers, mineral wool or the like) is carried by a frame which is slightly smaller than the duct in which it is inserted, thereby permitting a considerable amount of air to bypass the filter by leaking around the margin of the frame rather than passing through the filter media. In other applications, when gas flows of various sorts are being passed from one point to another, it is often desired to provide complete and thorough filtering without bypassing any portion of the gas flow around the filter.

A number of filter assemblies or constructions are known to the art wherein the filter media passes the periphery of the support means for the media circumferentially thereof. However, the devices provided to date of this sort have not been satisfactory in the cooperation of the support means for the filter media with the media itself, the type of structure employed to support the filter media, the means which engage portions of the support means to one another, and the like. It is not desirable to have the connection between two frame members, for example, at the periphery of the frame where they are subject to disengaging or other forces in installation and removal. Further, it is not desirable in any manner to have interiorly supported filter pads or media due to the possibility of loss of the filter media itself, insufficient support thereof, and the like. A frame which only contacts and supports one side of the filter media is not satisfactory in general use, additionally. Finally, it is eminently desirable that any means which connect the portions of a frame enclosing a filter media bat or the like to a like frame on the other side thereof be of such nature as to resist both compressive forces, as well as separating forces. If it is not the case, the frame members may well become disengaged during installation or removal with loss of the filter media, disarrangement of the same, and various other inconveniences. Yet further, it is desirable to provide connections between framing members for a pad of filter media which are of a minimum number whereby to easily engage and disengage the pad, which are strong and maintain usefulness over a long period of use with engagement and disengagement, and which have a strong and positive engagement with the frame members, yet permit convenient engagement and disengagement of the frame from one another for removal or replacement of the filter media pad.

An object of the invention, therefore, is to provide a filter construction for use in fluid flow ducts of various types which prevents bypassing of fluid around the filter, yet provides adequate flow passage of the filtered fluid comparable to conventional filter means.

Another object of the invention is to provide filter means for fluid flow ducts which are sufficiently rigid to be fixedly positioned across the ducts and retain their size and position therein in the manner of conventional filter, yet which also provide structural means for completely sealing the filter means in the duct passage whereby to completely prevent bypassing of fluid flow therepast.

Another object of the invention is to provide a filter construction in which the area of the filter media proper is greater than the inside cross-sectional area of the duct into which the filter is to be inserted, the unit being given the rigidity required to make it self-supporting by means of a frame spaced inwardly from the margin of the filter media itself.

Another object of the invention is to provide such a filter frame construction which may be employed, without limitation, with filter media of all types and which is usable over and over, thereby reducing the cost of installing new filters.

Another object of the invention is to provide filter frame means for use with flaccid, weak, flabby or extremely resilient filter media whereby such type of media may be employed without limitation, complete support and positioning being provided by the frame employed in connection therewith.

Another object of the invention is to provide framing means for filter media pads or bats which are easily engaged and disengaged therewith with a minimum of effort, yet which provides a secure rigid frame means for the said filter media.

Another object of the invention is to provide a filter framing construction which is of exceedingly simple construction yet provides an exceptionally effective engagement of the framing members with themselves and the filter media itself, the engagement means positive and secure yet simple and easy to engage and disengage, the frame means easy and cheap to manufacture.

Another object of the invention is to provide filter media framing means which effectively support flaccid, weak, flabby or resilient filter media by engagement therethrough and support of both sides thereof, said filter framing means, however, offering a minimum resistance to fluid flow through the entire pad of filter media whereby to obtain the maximum efficiency of filtering.

Another object of the invention is to provide filter media framing means which is of welded construction and has a noncorrosive wire frame with no flange or border of cardboard or metal over the filter area whereby to provide a maximum filtering area.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

Figure 1:
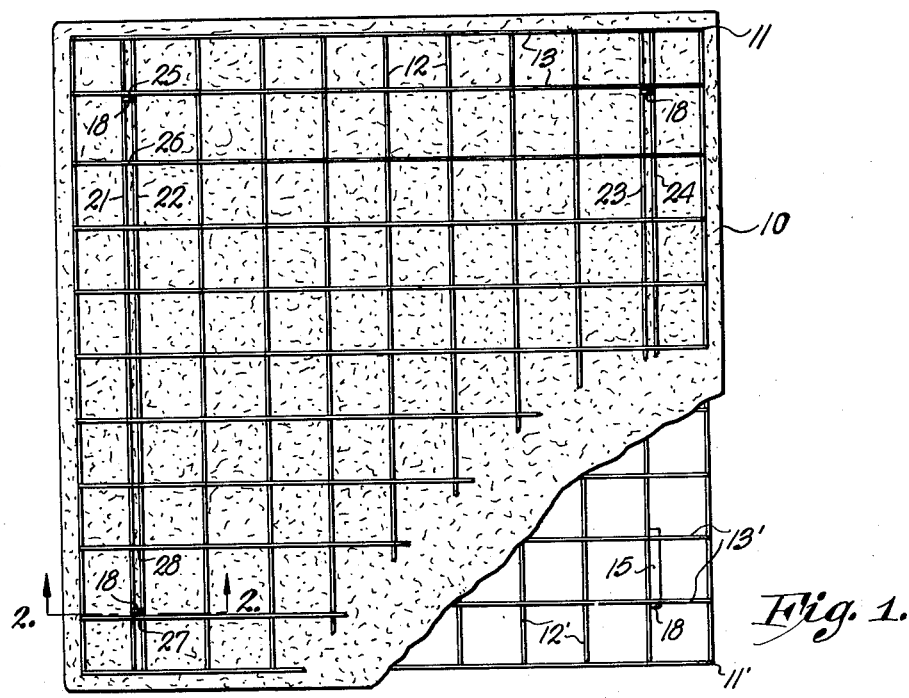
FIG. 1 is a front view of the subject filter construction and filter frame construction with parts cut away to better illustrate the engaging construction.

Referring to the figures, at 10 is shown a rectangular bat or mat of any suitable filter material or media for any desired fluid. For example, but not limiting, bat 10 may comprise a Fiberglas mat of fine diameter glass fiber mounted together with a thermosetting plastic resin (such as phenolformaldehyde) a fiber mat of any synthetic fibers, mineral wool, etc. The density, resilience, fiber diameter, binder percentage, composition, etc. of the mat 10 are not critical to the invention. However, it is considered that the mat or bat of filtering material or media employed in the inventive construction will often be too resilient, flaccid or weak to be ordinarily self-supporting in an air or fluid flow duct. As a specific example of a mat which would not be self-supporting, a three-micron diameter glass fiber mat with a phenol-formaldehyde resin binder of a density of approximately three pounds per cubic foot may be considered. The shape of the mat or bat is shown in the figures as rectangular. Thus it would be used in a rectangular duct. However, it must be noted that the shape of the mat is to be regulated only by the form of the duct, that is, it should be congruent therewith (although equal to or larger in area), and no particular shape should be limiting. The thickness of the mat is governed by the filtering properties desired, the character of the mat and the character of the fluid.

Framing or supporting means are provided, preferably positioned on each side of the mat or bat of filtering material. To conform to the requirements of the invention, the area of the framing means must be less than the area of the mat or bat. This is the characteristic best seen in FIG. 1, where the mat 10 extends circumferentially past the boundaries of the framing member. The framing member must have suitable perforations or access means to permit the fluid to be filtered to reach and pass through the mat 10. Additionally, there must be sufficient rigid structure in the framing means for it to be self-supporting and mat-supporting when in place on the mat. It is specifically contemplated that the framing means be removable and replaceable over another bat, the original filtering bat or mat being discarded with its entrained, filtered out material. In the drawings, the parts of the opposed frame members which are identical are numbered the same, but primed on one frame member. The frame members may be constructed of any suitable material including wire, expanded metal, plastic, Fiberglas, etc.

Referring to the figures, the framing construction for the filter assembly is made up of two rectangular perforated frames generally designated 11 and 11'. Again, the shape of the frame is not necessarily rectangular, although this is the most common, depending upon the fluid duct to be filtered. Frames 11 and 11' are made up of a plurality of vertical rods or wires 12 and 12' welded or otherwise fixedly attached to a like plurality of horizontal wires or rods 13 and 13'. The designations horizontal and vertical are for the purposes of description and refer only to FIG. 1 as the frame may be oriented in any desired direction in use. Two vertical rods 13 or 13' engage two horizontal rods or wires 12 or 12' to form the outline or circumferential boundary of the frame proper. The rods 12 and 12' are spaced equidistant from one another and parallel one to another. Likewise, the rods 13 are preferably spaced substantially equidistant from one another and substantially parallel to one another. A weld connection is preferably made at each crossing except as will be noted. The dimensions of the frame members are preferably substantially identical and the rods or wires 12 and 13 and 12' and 13' will preferably oppose one another when the frames are engaged. As previously mentioned, the mat is of greater circumferential dimension than the engaged frames whereby to circumferentially extend therebeyond.

A novel engagement means is provided to connect the frames 11 and 11' together. Such engagement means preferably comprise metal strips generally designated 14 and having base portions 15 welded as seen at 16 to a pair of horizontal rods 13 or 13'. A lance portion 17 extends normal to the frame on which the connecting means 14 is attached and is of sufficient length to penetrate the mat of filter material to space the frames 11 and 11' a desired distance apart. At the free end of member 17 is provided an extension 18 having a rounded end and hollowed base portions 19 and 20 at the base thereof to receive rods of a diameter equivalent to rods 12, 13, 12' and 13'. Members 14 may be formed from a strip of spring steel or the like.

Figure 2:
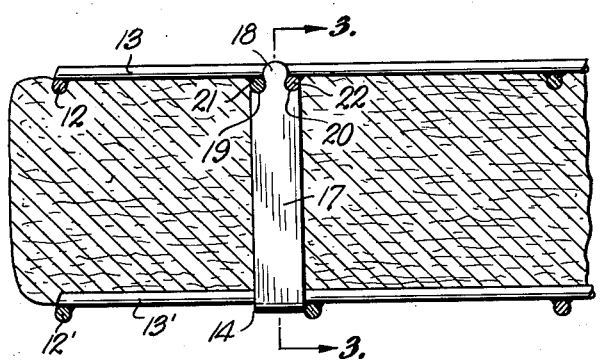
FIG. 2 is a view taken along the line 2—2 of FIG. 1 in the direction of the arrows.
Figure 3:
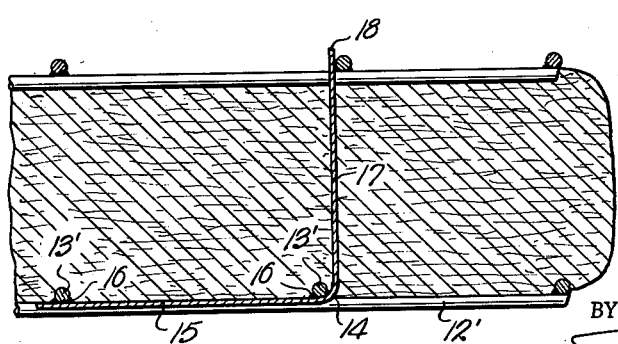
FIG. 3 is a view taken along the line 3—3 of FIG. 2 in the direction of the arrows.

On the opposing frame 11 in the figures, from that carrying the engaging means 14, 11' in the figures, there are provided paired rods designated 21 and 22 and 23 and 24, respectively. In FIG. 1, these rods are vertically oriented as opposed to the lance means 17, which in that figure are horizontally oriented. It is desired that the base means 15 of the engaging means 14 be positioned on the inward rods of the frame member supporting same as seen in FIGS. 2 and 3. On the other hand, it is especially desired that the paired rods 21–24, inclusive, be inwardly oriented rods as seen in FIGS. 2 and 3, particularly. These orientations are not necessary, but are preferred to cause as little as possible protrusion of the engaging means, both bases 15 and extensions 18, past the surface of the filter assembly. In such case, the bases 15 will be oriented parallel to the rods 21–24, inclusive, for engagement as may be seen in FIG. 1. Thus the bases 15 are vertically oriented and secured to horizontally extending rods 13'. Engaging rods 21–24, inclusive, are also vertically oriented and secured to the undersides of or the insides of horizontally oriented rods 13.

In the desired zones of engagement of the rods 21–24, inclusive, they must not be secured to the horizontally extending rods 13 so that they can move apart. This is achieved by having a pair of horizontal rod engagements adjacent the engaging zone not welded to any of the rods 21, 22, 23 and 24. To clarify this, in the upper left-hand engagement of FIG. 1, one of the rods 13 is designated 25 and another therebelow 26. The rods 25 and 26, are not welded to rods 21 and 22. Likewise, in the lower left-hand corner of FIG. 1, one horizontal rod 13 is designated 27 and the rod thereabove designated 28 where the same overlie rods 21 and 22. These rods also do not contain welds whereby to permit rods 21 and 22 to separate thereat when penetrated by an extension 18 of the lance 17. It should be most carefully noted that the junctions of wires 21 and 22 with the horizontal rods 13 both above and below the rods 25, 26, 28 and 27 are welded whereby the spring apart of the rods is limited to the non-welded junctions and sufficient snap back or resilience for the purposes desired is achieved. If desired, only one of the rods may be left unwelded, but this requires a greater deformation of that rod and the paired unwelded rods in the zones designnated are preferred.

In operation or use, to engage a bat of filter media with the frame members, the bat is laid on the frame 11 and then the frame 11 pressed down thereover so that lances 17 and enlarged heads 18 penetrate the filter media. Pencil holes or the like may be employed to provide the openings in less resilient bats. The extensions 18 are pushed through the resilient separable wires 21–24, inclusive, with the extension spaced inwardly of the next to the outside wires as seen at 25 and 27. Thus the frames are secured relative to one another against lateral movement both upwardly and downwardly and to each side. Additionally, it should be specifically noted that the frames cannot be forced closer to one another due to the seating of the rods 21–24, inclusive, on the shoulders 19 and 20, while they cannot be separated without unsnapping the extensions 18 from the rods 21–24, inclusive.

It should be understood that it is not necessary that the paired rods extend completely across the frame, but the construction shown is the most simple. Additionally, the members 12 and 13 may be other than rods, but the rods are the most convenient.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

In a filter assembly comprising, in combination, a three-dimensional body of resilient, deformable filter media of greater length than thickness having two substantially flat faces, a support structure for said body comprising two opposed frame members adapted to removably engage the body between same with one of said frame members abutting against each flat face of said body, each said frame member comprising a retaining screen of stiff open mesh substantially congruent in form to that of the face of the mat it abuts against, yet so diminished in area dimensions as to permit said mat to extend exterior thereof circumferentially thereto, the improvement which comprises means for releasably yet rigidly connecting said frame members with one another in spaced, parallel relationship enclosing therebetween said filter media body, said means including metallic lance members each fixed at one end thereof to one frame member, extending substantially normal thereto, adapted to penetrate said body and having at the other end thereof an engaging extension, said engaging extension of diminished width with respect to said lance member and having a rounded free end, and a base portion recessed on each side thereof to provide a zone of diminished width at said recessed base portion, said means also including paired, resiliently separable mesh members on the other frame member opposing each said lance member, said mesh members normally spaced apart a distance less than the maximum lance extension width, the engaging extensions of the lance members engageable in snap and unsnap fashion with said mesh members opposed thereto with the engagement comprising the mesh members positioned one on each side of the extension and in the recesses at the base thereof and in abutment against the lance member, whereby said frame members are rigidly spaced, when engaged, from one another in both resistance to separating force and against compressive force.

References Cited in the file of this patent

UNITED STATES PATENTS

| | | |
|---|---|---|
| 2,138,736 | Gaarder | Nov. 29, 1938 |
| 2,160,003 | Slayter et al. | May 30, 1939 |
| 2,637,540 | Rowe | May 5, 1953 |